(12) United States Patent
Satkunarajah et al.

(10) Patent No.: US 11,108,767 B2
(45) Date of Patent: Aug. 31, 2021

(54) APPARATUS AND SYSTEM FOR OBTAINING AND ENCRYPTING DOCUMENTARY MATERIALS

(71) Applicants: Tharmalingam Satkunarajah, Garden City, NY (US); Kalayini Sathasivam, Garden City, NY (US)

(72) Inventors: Tharmalingam Satkunarajah, Garden City, NY (US); Kalayini Sathasivam, Garden City, NY (US)

( * ) Notice: Subject to any disclaimer, the term of this patent is extended or adjusted under 35 U.S.C. 154(b) by 204 days.

(21) Appl. No.: 15/247,489

(22) Filed: Aug. 25, 2016

(65) Prior Publication Data

US 2017/0310664 A1    Oct. 26, 2017

Related U.S. Application Data

(60) Provisional application No. 62/325,878, filed on Apr. 21, 2016.

(51) Int. Cl.
| | |
|---|---|
| *H04L 29/06* | (2006.01) |
| *G06F 16/40* | (2019.01) |
| *G06F 16/93* | (2019.01) |
| *G06F 12/14* | (2006.01) |

(52) U.S. Cl.
CPC ...... *H04L 63/0861* (2013.01); *G06F 12/1408* (2013.01); *G06F 16/40* (2019.01); *G06F 16/93* (2019.01); *H04L 63/0428* (2013.01); *G06F 2212/1052* (2013.01); *G06F 2216/11* (2013.01)

(58) Field of Classification Search
None
See application file for complete search history.

(56) References Cited

U.S. PATENT DOCUMENTS

| 6,434,561 | B1* | 8/2002 | Durst, Jr. | H04N 1/33323 |
| 7,444,023 | B2* | 10/2008 | Mossakowski | H04N 7/1675 |
| | | | | 348/384.1 |
| 8,533,210 | B2* | 9/2013 | Shahraray | G06F 17/30849 |
| | | | | 707/756 |
| 9,014,265 | B1* | 4/2015 | Rintaluoma | H04N 19/14 |
| | | | | 375/240.12 |
| 9,329,692 | B2* | 5/2016 | Bai | G06F 3/017 |
| 9,697,231 | B2* | 7/2017 | Houh | G06F 17/30247 |
| 9,854,105 | B1* | 12/2017 | Krishnasamy | H04N 1/00037 |
| 2007/0143493 | A1* | 6/2007 | Mullig | G06F 17/30017 |
| | | | | 709/232 |
| 2012/0323925 | A1* | 12/2012 | Fitzsimmons | G06F 17/30038 |
| | | | | 707/741 |
| 2015/0172286 | A1* | 6/2015 | Tomlinson | H04L 63/0861 |
| | | | | 726/7 |
| 2017/0118205 | A1* | 4/2017 | Yang | H04L 63/0861 |

* cited by examiner

*Primary Examiner* — Piotr Poltorak
(74) *Attorney, Agent, or Firm* — Pasadena Legal Group; Norman R. Van Treeck

(57) ABSTRACT

The apparatus and systems provided herein relate to a distributed patent processing system. Such a system includes, in one particular arrangement web portals, mobile applications and an integrated secure network enabled hardware unit designed to capture documentary evidence relating to a technology or concept disclosure by an inventor. This disclosure is used to generate an encrypted data package for transmission to a national or international patent office. The package, upon receipt by one or more patent offices is accorded a priority and filing date just as in standard patent application filings.

14 Claims, 9 Drawing Sheets

PROVISIONAL PATENT POST-EXAMINATION PROCESS BLOCK DIAGRAM

← 116

APPARATUS AND SYSTEM FOR OBTAINING AND ENCRYPTING DOCUMENTARY MATERIALS

CROSS-REFERENCE TO RELATED PATENT APPLICATIONS

This application claims priority to U.S. Provisional Application Ser. No. 62/325,878 filed on Apr. 21, 2016, which is incorporated by reference herein in its entirety.

FIELD OF THE INVENTION

The present invention is directed to an apparatus and system for obtaining, encrypting and transmitting a collection of documentary materials.

BACKGROUND OF THE INVENTION

Those skilled in the art will appreciate that documenting evidence in support of various endeavors carries with it several risks. For example, when an inventor seeks to capture the complete disclosure of the invention proposed for patenting, it is possible that some critical features can be forgotten, ignored, or otherwise failed to be incorporated into a patent filing by the inventor's representative.

Furthermore, many patent disclosures lack sufficient details relevant to patentability because of errors or inconsistencies in the patent and claim drafting. In brief, some patent applications are poorly written, and fail to enable or claim the relevant invention. In some scenarios, the resulting patent is so narrow that the claims of the patent can be designed around, thus limiting its commercial usefulness.

Some patent applications are directed to a technology in search of a purpose or market. These applications describe technology that is of little commercial value, either because the invention itself has no market value, or there is a better way of solving the problem that the patent identifies as in need of a solution. Furthermore, some patent applications fail to be granted on the basis of existing technologies or teachings, so called prior art. In some scenarios, patents obtained at great expense are not exploited due to the strength of the claims, changes in technology or product and services, or misalignment with customers because of this prior art.

Obtaining a patent can be expensive for individuals or small companies. Researchers and inventors pay attorneys, agencies or agents to draft, file and prosecute patent applications, all of which incur costs. Likewise, there are significant costs associated with enforcing patents or turning the subject matter described in a patent into a real-world product.

Another problem is that a number of patents are granted that are only incremental improvements on technology and have greater utility as barriers to competition as opposed to pathways to innovation. In the digital and computer arts, where some patents are used by the assignee to obtain license and royalty fees, this is a common occurrence.

There also exist issues with patents being used against others to inhibit competition or to extract royalty payments. Such actions are typically taken by non-practicing entities, also colloquially known as patent trolls, patent holding companies (PHC), patent assertion entities (PAE), and non-practicing entities (NPE). A NPE is a person or company that attempts to enforce patent rights against accused infringers where the patent owner does not make or use the technology that is the subject matter of the patent.

A variation of the NPE problem is when companies make an attempt to develop products or services but, when their product fails, conclude that they can instead be more successful at monetizing their patent portfolio.

PAEs take advantage of uncertainty about the scope or validity of patent claims, especially in software-related patents because of the relative novelty of the technology and because it has been difficult to separate the "function" of the software (e.g., to produce a medical image) from the "means" by which that function is accomplished. Suits brought by PAEs have tripled from June 2011-2013, rising from 29 percent of all infringement suits to 62 percent of all infringement suits.

Estimates suggest that PAEs may have threatened over 100,000 companies with patent infringement last year alone. While aggressive litigation tactics are a hallmark of PAEs, some practicing firms are beginning to use them as well ("practicing" firms use their patents to design or manufacture products or processes). PAE activities hurt firms of all sizes. Although many significant settlements are from large companies, the majority of PAE suits target small and inventor-driven companies. In addition, PAEs are increasingly targeting end users of products, including many small businesses.

Therefore, what is needed is a technological solution to address the specific technical problems of prior art, non-practicing entities, cost and quality of patents.

SUMMARY OF THE INVENTION

Provided herein is an apparatus and system for capturing and encrypting multimedia evidentiary documentation. In one embodiment, a disclosure documentation device is provided comprising a processor configured to execute code stored within a memory accessible by the processor; one or more cameras connected to the processor and configured to transmit recordings. The disclosure documentation device also includes an audio recording device connected to the processor and configured to transmit audio data; a biometric authentication apparatus connected to the processor and configured to record biometric data; a physical document scanning device; and a printing device connected to the processor and configured to output one or more physical documents.

In a particular configuration, the processor of the disclosure documentation device is configured to record, with the one or more cameras, a speaker during a public speaking engagement and scan, using the scanning device, one or more physical documents used by the speaker during the public speaking engagement. Upon receipt of a conclusion signal, the processor is configured by code executing therein to generate a data package that includes at least a text file that provides a summary of the disclosure provided. However, in other arrangements a complete audio and video recording of the speaker speaking at the speaking engagement, and a transcript of the audio recording is provided. Electronic copies of the scanned documents are also provided. The processor is configured to encrypt the data package using biometric data from the biometric authentication apparatus and send the data package to a remote secure receiver computer.

In one or more embodiments, the invention also includes a receiving database configured to receive the data. Upon receipt, the data package is decrypted and a confirmation receipt is separately transmitted back to the disclosure documentation device.

A network security system is also connected via the Internet or a network between disclosure documentation device and the receiving remote secure receiver. The network security system is configured to allow remote authentication of the disclosure documentation device and monitor the inbound and outbound network exchanges between one or more databases connected to the remote secure receiver computer and the disclosure documentation device.

These and other aspects, features and advantages of the present invention can be further appreciated from the following discussion of particular embodiments thereof.

BRIEF DESCRIPTION OF THE DRAWINGS

The foregoing and other features of the present invention will be more readily apparent from the following detailed description and drawings of one or more exemplary embodiments of the invention in which.

DETAILED DESCRIPTION OF THE INVENTION

Figure 1:
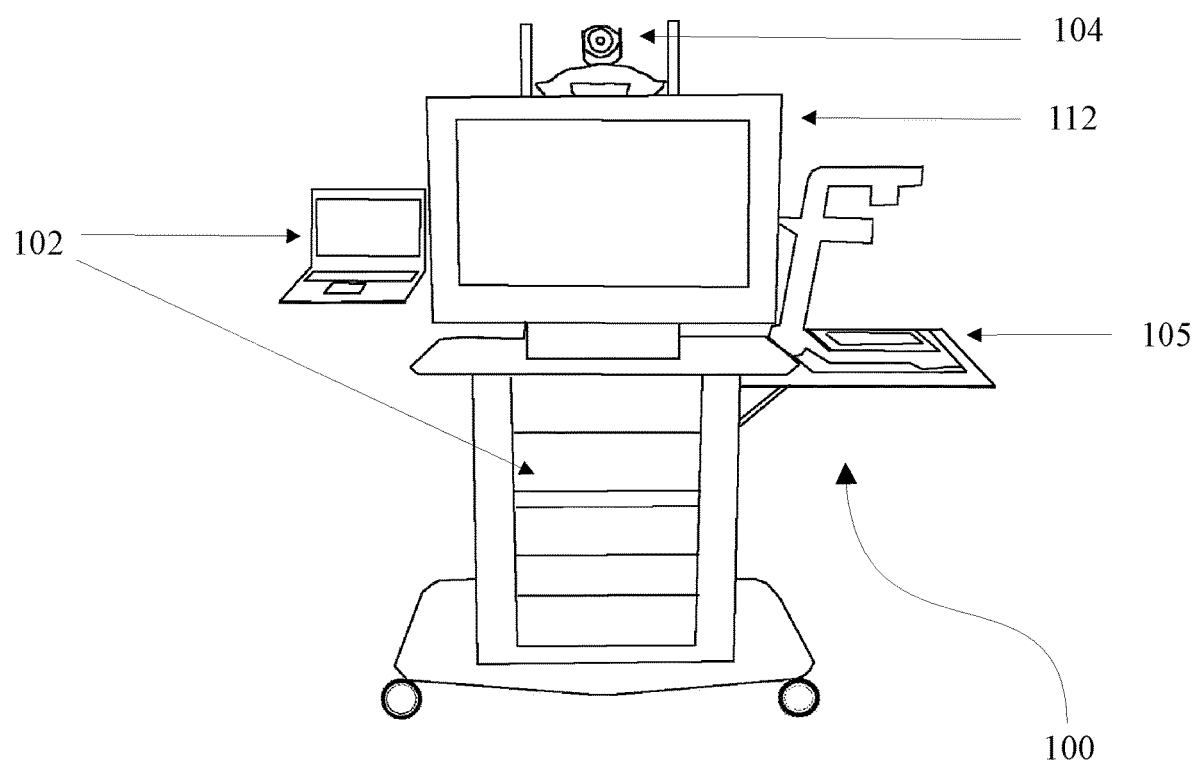
FIG. 1 is an overview illustration of the apparatus according to one embodiment of the invention.

By way of overview and introduction and in accordance with one or more embodiments of the present invention, the apparatuses and systems described herein are configured to permit and allow the following: fostering clearer patents with a high standard of novelty and non-obviousness; reducing disparity in the costs of litigation for patent owners and technology users; and increasing the adaptability of the innovation system to challenges posed by new technologies and new business models. Furthermore, the system and methods described herein are designed to prevent the loss of patent rights due to untimely disclosures or public statements.

The apparatus and systems provided herein relate to a distributed patent processing system. Such an apparatus and system includes, in one particular arrangement: web portals, mobile applications and integrated secure network enabled hardware units designed to capture documentary evidence relating to a technology or concepts disclosed by an inventor or user. This disclosure is used to generate an encrypted data package for transmission to a national or international patent office. The package, upon receipt by one or more patent offices is accorded a priority and filing date just as in standard patent application filings.

In one aspect of the present invention, the apparatuses and systems provided herein are designed to overcome technological difficulties inherent in extracting and encrypting a data package for transmission to a national or international patent office. More specifically, raw video, audio, textual and other data collected by conventional processing systems have problems discerning and extracting relevant data from the gathered raw data for inclusion in a patent application. For example, audio data can be transcribed into textual format, however conventional technological systems are unable to parse converted text adequately to address the needs of patent applicants. Similarly, conventional video frame analysis cannot identify imagery relevant for patent application submission. Further, such techniques are secure and capable of application throughout each step of patent application transmission, at both the inventor submission end and the patent office receiving end.

As a result, the system described enables inventor(s) to disclose the contents of a purported patent application, presentation, talk or demonstration in a secure, protected, trustworthy environment without the need to file a separate prepared patent application.

In order to implement the described system, a sensor embedded platform is provided where content is captured, encrypted and transmitted to a protected secure database that is only accessible by authorized officer, such as a patent office official or employee. For example, a disclosure documentation device is provided to a speaker, demonstrator or lecturer so that prior to, or during, or following a public disclosure event (such as a demonstration, conference or symposium) the disclosure is recorded, its content is extracted, analyzed such as through natural language processing, for relevant patent application purposes, composed into a data structure applicable for the particular patent office, and sent to the patent office with biometric authentication data. Alternatively, in private institutions or facilities, the sensor embedded platform is provided for periodic use by individuals to record and submit documents in furtherance of a patent application.

System Overview

Figure 2:
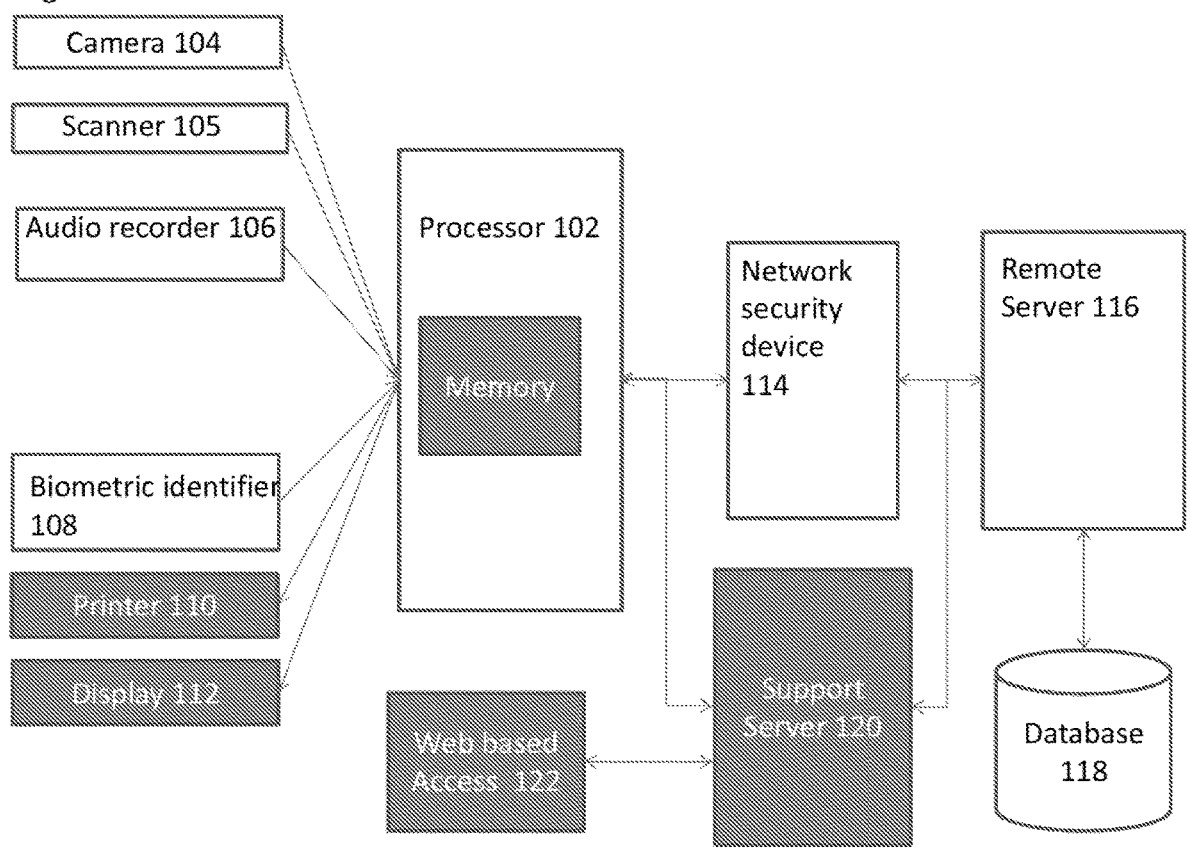
FIG. 2 is a block diagram of an example system in accordance with an embodiment of the present invention.

With particular reference to FIGS. 1 and 2, the sensor embedded platform is a disclosure documentation device 100 comprising, a processor 102 configured to execute code stored within a memory accessible by the processor 102; and connected to one or more data acquisition devices. The data acquisition devices are selected from: one or more cameras 104 connected to the processor 102 and configured to transmit recordings; an audio recording device 106 connected to the processor 102 and configured to transmit audio data; a biometric authentication apparatus 108 connected to the processor 102 and configured to record biometric data, a physical document scanning device 105. In a particular arrangement the disclosure documentation device 100 includes a printing device 110 connected to the processor 102 and configured to output one or more physical documents; and a display device 112 configured to output information to the user.

In accordance with one aspect of the described apparatus, the processor 102 is configured to instruct the one or more cameras 104 to record a speaker during a public speaking engagement; to instruct the scanning device 105 to scan the one or more physical documents used by the speaker during the public speaking engagement, wherein upon receipt of a conclusion signal, the processor 102 is configured by code executing therein to generate a data package that includes at least a portion of the data obtained from the data acquisitions devices, wherein the data package is encrypted using biometric data from the biometric authentication apparatus, wherein the processor 102 is configured to only transmit data to a secure receiver. In one configuration, a server is integrated into a national or international patent office computing system.

Computer

The processor 102 is a computing device, such as a commercially available standalone notebook or desktop computer configured to directly, or via the Internet, access and communicate data with one or more remote servers or computers.

Alternatively, the processor 102 is a portable computing device such as an Apple Ipad/Iphone® or Android® device or other commercially available mobile electronic device. In other embodiments, the processor 102 is, or includes, custom or non-standard hardware configurations. For instance, the processor 102 is a micro-computer or collection of micro-computing elements, computer-on-chip, prototyping devices or "hobby" computing elements. The processor 102 can comprise a single processor, multiple discrete processors, a multi-core processor, or other type of processor(s) known to those of skill in the art, depending on the particular embodiment.

In one or more embodiments, the processor is directly or indirectly connected to one or more memory storage devices (memories) to form a microcontroller structure. For example, one or more memories can be embedded into the processor to as a microcontroller. In accordance with one or more embodiments, the memory comprises one or more volatile and non-volatile memories, such as Read Only Memory ("ROM"), Random Access Memory ("RAM"), Electrically Erasable Programmable Read-Only Memory ("EEPROM"), Phase Change Memory ("PCM") or other memory types. Such memories can be fixed or removable, as is known to those of ordinary skill in the art, such as through the use of removable media cards or modules. In one or more embodiments, the memory of the processor 102 provides for storage of application program and data files. One or more memories provide program code that the processor 102 reads and executes at startup or initialization, which may instruct the processor 102 as to specific program code from RAM to load at startup.

The processor 102 is configured with code executing therein to access various peripheral devices and network interfaces. For instance, the processor 102 is configured to communicate over the Internet with one or more remote servers, computers, peripherals or other hardware using standard or custom communication protocols and settings (e.g., TCP/IP, etc.).

Display

The processor 102 is configured to output display data through a display device 112. The display 112 can be of any type suitable for outputting display data and for user interaction as provided herein. For example, the display 112 can be an organic light-emitting diode ("OLED"), light-emitting diode ("LED"), LED matrix or similar display types. In a particular embodiment, the display device is a LED (light emitting diode) display having a true color 24 bit LED monitor. In a further embodiment, the display 112 is a touch-screen display (e.g., resistive touch input panel, capacitive input panel, or other haptic display). The touch screen can include a stylus or other input device for making annotations directly onto the display.

Input Devices

In a particular embodiment, the processor 102 also includes one or more input devices, such as keyboards, buttons, mouse input devices and other generally available computer input peripherals.

Camera

In one non-limiting embodiment, the processor 102 is configured to receive data from a camera device 104. In a particular arrangement, the camera device 104 is a plurality of camera or image processing devices. The camera devices 104, in accordance with one embodiment, are video cameras designed to capture color video of objects within the field of view of the camera. In one arrangement, the camera device 104 is integral to the processor 102, such as with an integrated camera of a smartphone or other computing device. In a further embodiment, the camera device 104 is an "off the shelf" digital camera or web-camera that is connected to the processor 102 using standard interfaces such as USB, FIREWIRE, Wi-Fi, Bluetooth, and other wired or wireless communication technologies suitable for the transmission video data. The camera, in one non-limiting embodiment, includes an integrated microphone such that a separate microphone 106 is not needed.

As shown in FIG. 2, the apparatus includes an audio recorder 106 configured to capture high-fidelity and low-noise audio recordings of the user. Here, the audio recording device 106 includes one or more microphones, cooperating with one another to capture any sounds, such as a conversation or presentation by a user of the embedded platform. The captured sounds are sent to the processor 102 for further evaluation and processing.

Scanner

The processor 102 is also connected to a document scanner 105. The document scanner is a device configured to take images of documents, such as a hand-drawn notes, printed materials, or mixed media works, and convert them into a format usable by the processor 102, such as through optical character recognition. In a particular embodiment, the scanner 105 is a commercially available document scanning apparatus using available software and hardware interfaces to obtain and transmit data to the processor 102. Alternatively, the scanner 105 is a custom document imaging system that has proprietary or custom software, hardware and/or functionality that allow it to perform the functions contemplated herein.

Biometric Identifier

The processor 102, in one particular embodiment, includes a biometric identifier 108. The biometric identifier 108 uses one or more sensors to obtain biometric data from an individual and pass that information to the processor 102. For instance, in a particular embodiment, the biometric identifier includes one or more finger print identification devices. In an alternative or further combination, the biometric identifier 108 includes an iris scanner, facial recognition camera, voice recognition technology, and/or other biometric identification devices. The biometric identifier 108 can provide a secure, authenticated environment by requiring validation of data from one or more biometric readings, such as fingerprint analysis, facial recognition, iris recognition, retinal scanning, voice identification. For example, an individual might have to verify his or her fingerprint pattern, or speak a passcode in order to connect to the system or transmit documents or images to the patent office. In one or more embodiments, the processor 102 is configured by code executing therein to implement a hybrid wavelet application having a multiple level fragmented feature descriptor and Mel-Frequency Cepstral Coefficients (MFCCs). Here, the discrete wavelet transform functionality is deployed to extract features of facial structure, fingerprint, human irises and voice.

Feature extraction can be accomplished by probabilistic and radial function neural networks. For example, a Recurrent Neural Network (RNN) can be employed to extract the features of an individual, as an RNN can be trained to analyze the large amounts of data which accompany biometric identification measures. Additionally, an RNN provides a good learning rate (i.e., the rate at which the intelligent system has been trained) for such datasets. In one or more embodiments, the neural network employed integrates long memory. In this way, the rate of training is enhanced and that in turn decreases the error rate. In one or more embodiments, multiple layers of recurrent layers can be used to attain high efficiency of the system.

The feature vectors of these four features (facial structure, fingerprint, human irises and voice) can be combined using decision fusion techniques. In one or more embodiments, feature extraction become more efficient and accurate at identifying the individual by learning and/or training upon each positive identification. For example, the biometric identifier can learn a particular individual's vocal style. Performance tests can also be conducted and compared with traditional approaches to evaluate effectiveness. In a particular embodiment, the camera 104 is used to obtain images of the user and these images are subject to biometric data extraction algorithms configured as code and executed on the processor 102, or a remote service, to extract sufficient biometric data from the image. Alternatively, the camera 104 is configured to obtain a first type of biometric data and the biometric identifier 108 is configured to obtain a second type of biometric data.

Those skilled in the art will appreciate that the disclosure recording device 100 has unique MAC address and IP address and is connected through one or more datacenters (such as the remote server) using a secure tunneling protocol IPSEC/Layer 2.

The disclosure recording device 100 is further configurable to interface with one or more patent office computers, main frames or servers that are protected by local and remote IT security regardless of placement in different zones around a country, region or world.

The disclosure recording device 100 is, in one embodiment, installed in a facility provided by a public or private organization and operates as a remote authenticated secure machine.

Operation of the Embedded System

Figure 3:
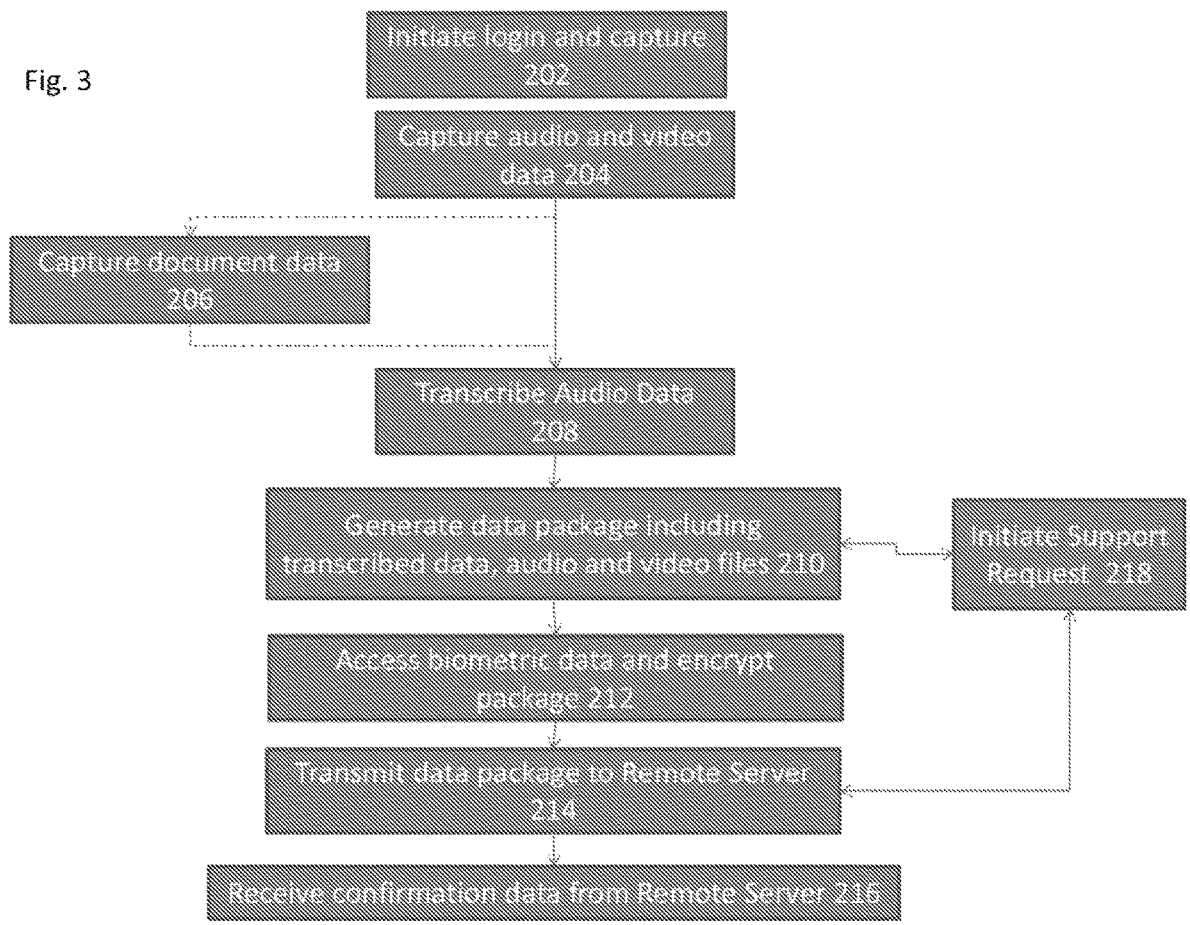
FIG. 3 is a flow diagram of the operation of an example system in accordance with an embodiment of the present invention.
Figure 4:
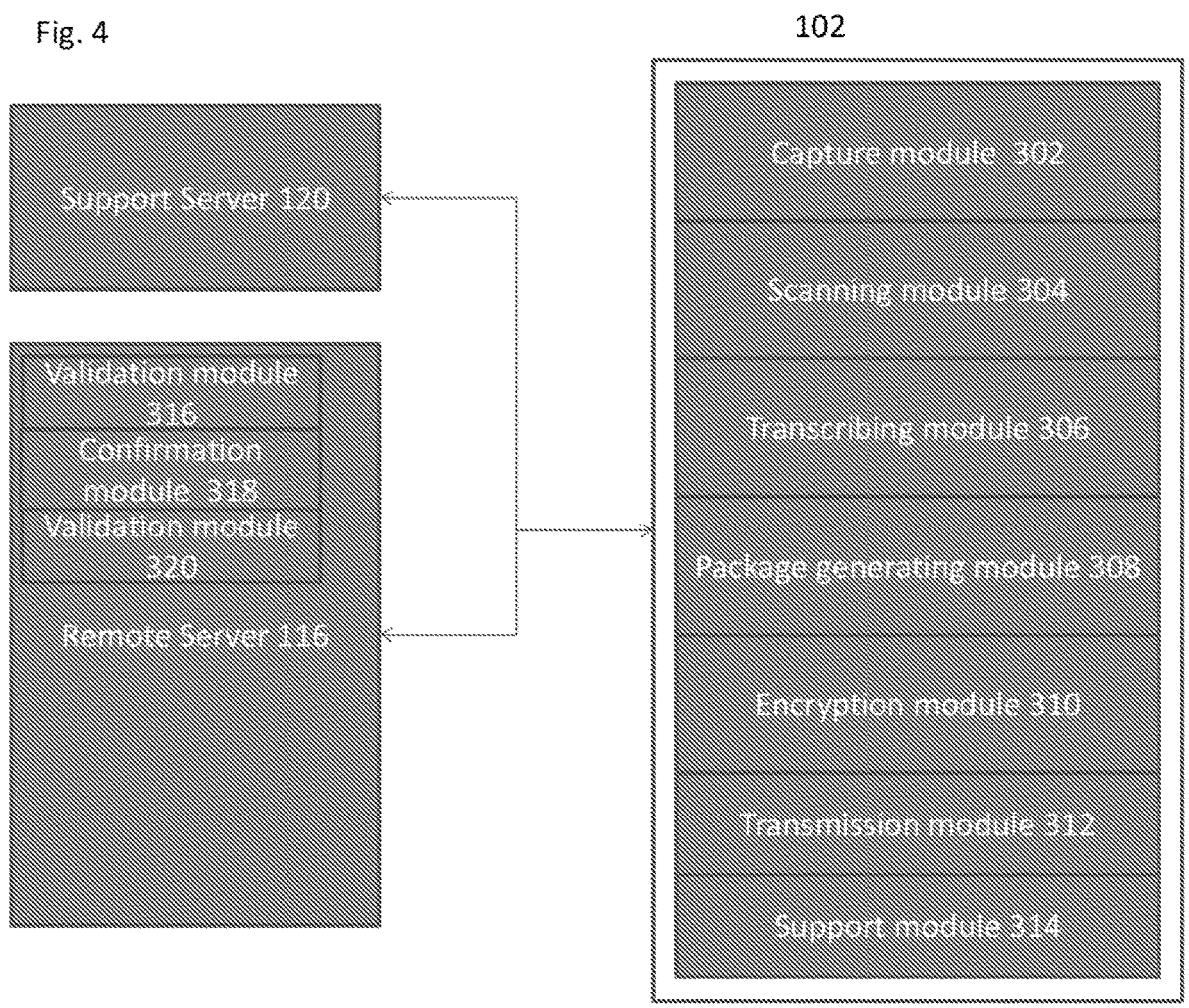
FIG. 4 is an overview block diagram detailing elements utilized by the system described herein in accordance with one embodiment of the invention.

With reference to FIGS. 3 and 4, a user operating the described apparatus obtains an account or login from a web based access point 122 (e.g. a web portal or user registration portal) or from the disclosure recording device 100 directly. Once the registration is accomplished using a web portal, mobile application or disclosure recording device 100, the user is free to record and scan the desired disclosure. In one arrangement, the user can set an appointment for using the described embedded system based on reservation priority through the web based access point 122. Alternatively, the disclosure recording device 100 operates on a "first come first served" basis.

In accordance with one embodiment of the present apparatus, the disclosure recording device 100 provides a 15 minute time limit to disclose the subject matter. However, in alternative configurations, the disclosure recording apparatus captures the subject matter for as long as the user desires.

User Login

The user, for example, may be an individual researcher, scientist, young entrepreneur, student, inventor, company, university, institution, or research or lab assistant. Using the disclosure recording device 100, the login information is entered, as in step 202. For example, the following information can be obtained or generated from or for the user prior to a recording session: user ID, password, email ID, mobile number, address residential, address official, appointment code, ID proof (Passport number/License/State ID/Student ID/Country ID), as in a standard photo in JPEG, TIFF, PDF, GIF, DOC, or other known form. Alternatively, the authorization is accomplished using existing biometric systems, such as through a fingerprint scanner or iris/retinal scanner. In one or more specific instances where the disclosure recording device 100 is used to record information of a sensitive nature (national security, health records, etc.) then additional security is provided in the form of proof and prior identify certification that is pre-registered with security departments.

Operation of Disclosure Recording Device

During operation of the disclosure recording device 100, the processor 102 accesses and executes one or more software modules encoded in a storage or memory. The software modules can comprise one or more software programs or applications having computer program code or a set of instructions executed in the processor 102. In one or more embodiments, included among the software modules are: a capture module 302 that configures the camera 104 and/or audio recorder 106 to capture video and audio presentations; a scanning module 304 that configures the system to scan and record data in scanned documents at scanner 105; a transcribing module 306 comprising program code to instruct the processor to convert captured video and/or audio data into textual form. Such conversions can include parsing the textual data using one or more data mining or natural language processing algorithms or applications to extract, format or condition the textual data into a patent application; a package generating module 308 comprising program code to instruct the processor to generate a data package from the converted captured data for transmission to a patent office; an encryption module 310 comprising program code to instruct the processor to encrypt the data package; a transmission module 312 that configures the system to transmit the data package to a patent office; and a support module 314 comprising program code for one or more modules to instruct the system to implement one or more support services as described later herein.

In a particular arrangement, once the user is authenticated by the system, the processor 102 activates and/or controls one or more of the camera, scanner, and/or microphone and receives data acquired by the same. Using the data collected from the camera 104, the scanner 105, audio recording device 106 and the biometric identifier 108, the processor 102 is configured to generate a data package that provides the received data streams in a format suitable for transmission to a national or international patent office. For example, the processor 102, as provided in more detail with reference to FIGS. 3 and 4 executes program code to instruct capture of a disclosure event, such as a presentation. In this arrangement, the embedded platform is positioned to capture audio and video data from the camera 104 and the recording device 106 as in step 202 using capture module 302. By way of non-limiting example, the processor 102 stores complete records of any images or audio data captured within the local storage of the processor 102.

If the presenter or discloser has documents or objects that need to be scanned or otherwise input into the computer, the scanner 105 is utilized to scan the documents into a suitable digital format for use by the processor 102. In one arrangement shown in step 206, the processor 102, configured by a document scanning module 304, receives data from the scanning device and stores the data within a local or remote storage device (not shown). Document scanning module 304 can include application of functional clustering techniques that evaluate threshold values. For example, the document scanning module 304 implements program code that executes an algorithm to eliminate scanned redundant frames. In one or more embodiments, the document scanning module 304 includes a particular storing and comparing technique. For example, as a document is scanned by scanner 105, the scanner takes one or more snapshots of the document and stores them for future reference. In future scans, the document scanning module 304 compares newly taken snapshots to previously stored snapshots. If the document scanning module 304 recognizes that a particular snapshot is redundant of a stored snapshot, the document scanning module instructs the scanner 105 to skip scanning that snapshot and instead use the previously stored snapshot. In this way, the document scanning module 304 avoids scanning redundant frames and reduces scanning time relative to conventional scanning algorithms.

Similarly, audio data obtained from either the camera or from the audio capture device is transcribed by the processor 102, according to step 208, to produce a text record of audio data associated with the camera, or embodied in an audio file. Conventional speech-to-text approaches have difficulty separating intended spoken words (i.e., a signal) from other ambient sounds (i.e., noise), as well as interpreting when words start and end. Speech typically is of higher frequency than noise, and in one or more embodiments, the processor executes one or more software modules to identify probable speech. For example, to differentiate the high frequency part from unwanted noise, the present apparatuses and systems implement Mel Frequency Cepstral Coefficients (MFCCs). The audio or the speech signal is segmented into overlapping frames and for each MFCC, features are obtained and are trained using a flexible training model (e.g., Hidden Markov Models). MFCC implementation provides a low error rate and can make use of neural networks to increase accuracy and efficiency.

In one or more embodiments, the processor 102 configured by a transcription module executing as code therein, uses access to third-party software, including translation and transcription services provided through an API. The resulting transcription is used along with the camera and scan data to generate a data package representing the disclosure of the presenter during the disclosure event.

As shown in step 210, the data captured by the camera 104, scanner 105, and audio devices 106 are used to generate a data package using the package generation module 308. In one or more embodiments, the generated package is a text document that contains at least the transcript of the audio data captured by the audio recording device 106 or the camera 104. In one or more embodiments, transcript generation occurs by identifying higher frequencies in the auto data and extracting associated information using MFCC analysis. The coefficients are obtained for every overlapping frame that constitutes the audio signal. Package generation module 308 takes such extracted data and converts it to textual documents. In a further embodiment, the generated package is a text document formatted for submission to a national or international patent office and includes one or more images taken by the camera 104 (including, in one or more instances of screen captures). For example, a generated package is produced as a single portable document file (PDF) or .doc file that includes text extracted from the scanned documents, transcripts from the audio device or camera, and selected images from the video. Those skilled in the art will appreciate that other file formats are suitable as well. The images pertaining to the document are tagged in a certain format that corresponds to the related position in the template document. When generating the package, the tagged portions are used to place the images in their respective positions. In one or more embodiments, the package generation module 308 searches for trigger words to start and stop recording for particular patent sections.

In a particular implementation, the generation module 308 presents on the display 112 options to the user regarding the selection of specific excerpts or portions of the acquired video, audio, or scanned data. For example, the user is presented with the option to convert frames of captured video data into images and append those images to the generated data package. In one or more embodiments, the system can analyze appended images to identify likely objects to be referenced in a patent drawing. In one or more embodiments, morphological operations using support vector machines can be applied to detect objects and apply appropriate classifications (e.g., reference numerals). Morphological operations apply a structuring element to an input image, thereby creating an output image of the same size of that of input image. For example, morphological operations include dilation (i.e., increasing the white pixel area in binary images), erosion (i.e., decreasing the white pixel area in binary images), and edge detection classifier techniques (i.e., locating the boundaries of objects within images by detecting discontinuities in brightness). Dilation and erosion processes can be applied separately or simultaneously, and can be repeated for a specific number of times on the image. Edge detection techniques can be used for image segmentation and data extraction. Such techniques can be combined, e.g., performing edge detection on an image that has been subjected to dilation and erosion, to result in extraction of data that can be classified. Conventional dilation, erosion and edge detection is applicable for a certain set of images. In one aspect, the present dilation, erosion and edge detection techniques improve upon the convention by being able to be repeated any number of times based on a set threshold, thereby providing better image detection. Acquired data can be classified using an efficient classifier, such as via a support vector machine (SVM). A SVM is a discriminative classifier formally defined by a separating hyperplane. Thus, in one or more embodiments, given labeled training data (supervised learning), the generation module 308 outputs an optimal hyperplane which categorizes new examples.

Further, data corresponding to such classifications can be extracted and added to the generated package. In a further implementation the processor 102 is configured with an analysis submodule that automatically extracts frames from the video based on the content of the video stream. Here, when the objects recorded have been changed, such as when presentation materials (a slide, screen, or white board) are altered, then a new frame from the video is acquired and attached. The processor 102 can determine video frame changes by applying matrix comparison methods. In one or more embodiments, the processor 102 implements a corner point matrix comparison method. The corner points of each video frame are compared and if the corner points are determined to be different, then the video frames are determined to be different. This method improves upon conventional matrix comparison methods by not requiring each pixel of the entire video frame to be compared, thereby saving computing time and resources. Further, in contrast to implementing conventional methods, if there is an error in the video frame comparison (e.g., the image has an error or the comparison calculation reaches an incorrect result), such errors are not compounded by incorporating that error into a full video frame comparison.

The processor is configured to obtain at least a first frame from the video source and convert that frame into a format suitable for appending to the text transcript. In a further configuration, an object detection analysis is used on each frame, or selections of frames (e.g., each $100^{th}$ frame) of the video source to identify key items of interest (such as, but not limited to, written formulas, models, arrangements, or demonstrable). Where an object detected in a first frame is not present in a second, subsequent frame, the second frame is likewise extracted. As one non-limiting example, each extracted frame is converted into an image file suitable for appending to the generated transcript. In a particular embodiment, each extracted frame is labeled sequentially (e.g., FIG. 1, FIG. 2 etc.). Reference to each converted and labeled image file is made in a patent application or report.

It will be appreciated that for some formats of a generated transcript, the audio associated with the video will include time stamps or other notifications to indicate when in the video the transcribed content was provided. In this arrangement, a time stamp is associated with the each converted image file. Using the time information, the reference to the labeled, extracted frame (e.g., FIG. 1) is inserted in the transcript at a location that corresponds with the time in the transcript where the frame was captured. As a non-limiting example, when a portion N of the transcript was captured a time T1, and the extracted video frame F1 was extracted at a time that was similar to T1, then reference to F1 is inserted into the portion N, such as through a signaling statement (e.g. "As shown in FIG. 1").

Where there is no change in object presence (regardless of if the object has moved relative to a background) between subsequent images, a new frame is selected and compared. The evaluation and extraction process will continue until the end of the video stream.

In an alternative arrangement, a threshold is set for the amount of difference necessary between the first and second images to warrant inclusion of the image into the transcript. For example, a difference of more than 10% in the overall pixels between the first and second images will trigger the inclusion of the second image. Alternatively, a difference of more than 10% in the identified objects between the frames can be set as a threshold value for incorporating the image into the transcript.

In a further embodiment, one or more pre-defined objects are identified by a user, such as through a user interface that allows the user to select particular frames or portions of frames of the captured video. Likewise, the user is able to select, using the display device one or more video frames for direct inclusion as images into the transcript.

In a particular embodiment, each frame is subject to a dilation, erosion or edge detection algorithm to identify features, objects, points of interest or other morphological artifacts within the frame. These features are labeled, indexed or otherwise classified and stored in a memory. In a further arrangement, the processor is configured to compare the identified features to one another. By comparing the identified features, the processor is able to more efficiently process the video frames.

In prior art systems, each image or frame was reduced to a pixel matrix and the matrices were compared to deduce changes between video frames. Such comparisons result in error due to changes in lighting, movement, and other possible sources of noise in the image(s). In contrast, comparing features identified using an image corner feature identification algorithm as provided herein reduces the need to compare each pixel to one another and results in less errors.

Upon generation of the data package, the user is prompted to provide biometric data to digitally sign or encrypt the data package. For example, the data package is encrypted, as in step 212 using the biometric data such that only an authorized user will have the ability to read or inspect the generated data package. Conventional image encryption, which decrypts at the user end, is vulnerable to malicious attack attempts and lacks counter-attack measures. In one embodiment, the encryption is carried out by encryption module 310. In contrast to conventional image encryption techniques, encryption module 310 implements pixel row-wise encryption capable of decryption between the user side and the package delivery endpoint. Additionally, the key for each pixel row-wise encryption can also be encrypted. At the user end, the key is decrypted first and then the content of each row is decrypted. In this way, confidentiality and security of the documents is preserved during transfer. Furthermore, the video obtained by the camera 104 is encrypted in specific format such that it can only be decrypted by authorized users or devices, such as by a specific remote server (e.g., remote server 116).

In circumstances where the user wishes to file the data package at a national or international patent office, the processor 102 provides the user with prompts to answer any questions or attest to any documents that are necessary for such a filing. Likewise, the processor 102 configures the display 112 to prompt the user to select those patent offices that the user wishes to submit the data package. Then, the processor 102 executes code to take the user responses and incorporate such information into the data package for filing.

In the event that the selected office requires payment of fees for processing the patent application, the processor 102 configures the display 112 to allow a user to select a method of payment. For example, the processor 102 causes the display to provide a field for entry of a credit card number, Bitcoin (and/or other virtual currencies), Apple Pay, Google Pay, Paypal, direct debit, wire transfer, direct connection or other form of payment processing account. This payment is separately encrypted and combined with the data package for transmission. Alternatively, the disclosure recording device 100 is equipped with a credit card swipe device, a bill or cash acceptance device or other payment and return mechanisms. In a further arrangement, the encrypted payment is made to a separate payment processor through a second connection. The separate payment processor, in turn, furnishes payment to the national or international patent office.

The secured data package is sent, as shown in step 214, to a remote server 116. In one or more embodiments, the data package is sent through a firewall established by a network security appliance 114. The network security appliance is in one embodiment a separate device interposed on a network between the processor 102 and the remote server 116. However, in an alternative arrangement, the network security appliance 114 is a software based implementation that is managed by a hosting service, remote processing application or by the remote server 116 itself. In one or more embodiments, step 214 is automatically executed by the processor 102, for example, upon encryption by the encryption module 310, or after verification of payment of patent application processing fees.

The remote server 116 can access and execute one or more software modules encoded in a storage or memory. The remote server software modules can comprise one or more software programs or applications having computer program code or a set of instructions executed by a processor at the remote server 116. In one or more embodiments, included among the remote server software modules are: one or more validation modules 316, 320 configured to validate the data package for compliance with filing requirements of the patent office; and/or a confirmation module 318 configured to transmit a confirmation receipt from the remote server 116 to the processor 102.

Once the host server 116 receives the data package, the data package is decrypted, if necessary, and stored within the database 118 accessible to the remote server 116. The database 118 can be, for example, a NOSQL database or other persistent storage engine for logging data from servers and other machine data. Where the user included a request for entry into a patent office, the remote server 116 performs a validation check, using the validation module 316, on the data package ensuring compliance with any filing requirements. In a further arrangement, the data package is scanned for malicious software (e.g., viruses, Trojans, worms, logic bombs, etc.). Upon finding such malicious software, the validation module sanitizes the data package by removing the malicious component of the data package, or quarantines the data package. In a further embodiment, the confirmation module 318 informs the user that the data package has been corrupted, infected or otherwise unsuitable for filing at the relevant office. Upon passing the compliance check, and verifying payment details, the remote server 116 files the application at the indicated patent offices.

Upon successfully filing the documents as the selected offices, the remote server 116, using the confirmation module 318, transmits back to the processor 102 a receipt or confirmation of the filing, a customer account number, any filing notices or documents, and copies of the document(s) as filed at step 216.

As shown, the apparatus, system and methods described allow the discloser of confidential information, such as patentable information, to use the embedded platform, not only as a patent application center, but as a confidential data disclosure device.

Furthermore, through the use of one or more support modules 314, the disclosure recording device 100 also functions as a terminal or access point for communications with one or more remote service providers as in step 218. For example, upon using the disclosure capture apparatus 100 described, the user is able to communicate with support personnel relating to marketing, business venture capital, legal, selling patent and other support services.

Here, the confirmation module 318 generates a customer account and/or login. In one or more embodiments, the customer account and/or login can be associated with a customer number or other identifiers. This data is sent to the processor 102 and is provided to the user, either as displayed text on the display 112, contained within an email to the user, or generated as part of the printout generated by the printer. Using this customer account, the user is able to access support services hosted by the support server 120 relating to the disclosure capture and the prosecution of any resulting patent application or document.

While the user can access support services from the processor 102, for ease of use, in one or more embodiments, a web-based or other access point 122 generally accessible from mobile or portable computing apparatus is provided. Here, a web app or native application for a mobile device, tablet, computer or device allows the user to communicate with the support server 120 without need of the disclosure recording device 100. Thus, individual researchers, scientists, innovative entrepreneurs, patent attorneys and the investors are able to utilize the apparatus and system described to provide a more efficient, quick, reliable and profitable way of obtaining disclosures or documenting confidential information for inclusion into a patent document.

Support Services

Those possessing an ordinary level of skill in the requisite art will appreciate that the provided apparatus and system are usable to solve numerous problems associated with obtaining an accurate disclosure of patent information so as to preserve priority dates and ensure that the subject matter is accurately described. Furthermore, the apparatus and system described are useful to protect individuals and corporations from infringement and also provide information to resolve inventorship disputes between various companies by providing cost effective support regarding an independently verifiable documentation data and disclosure of the subject matter of the invention described using the disclosure recording device 100.

The support services, configured as a one or more modules operating within the support server, allow the user to access a plurality of support features and functionalities, including human and software based software agents available to assist the user/account holder in filing file a patent or other submission without fearing about patent infringement or dominance by corporate companies.

In one or more arrangements, the support server is further configured with one or more modules to generate an auction or clearance house for the sale of complete or partial patent rights. For example, one or more auction modules allow the user to submit the generated disclosure for review by investors who are able to submit bids on the rights to the generated disclosure. In a further arrangement, the user is enabled to send advertisements to identified individuals that include a time-limited access to review the generated disclosure.

In a particular arrangement, the one or more auction modules are configured to make requests to a distributed database server, which enables multiple simultaneous transactions. In this arrangement, rights owners can place current and/or future patent rights up for bidding, and have the option to limit the sale of rights geographically (e.g., only sell US rights), or to advertise in a particular technological sector or industry. Once the rights are listed, this arrangement solicits bids within a predetermined timeframe. Each received bid is cached at the distributed database server, and a map or index is created in order to track the present high bid and total number of bids. This approach minimizes the computer resources necessary to hyold the auction.

In one embodiment, the auction modules are configured to only display a present high bid and the total number of bids. Further, upon predetermined intervals (which can be adjusted if a particular auction is of higher interest), the auction modules refresh data associated with the present high bid and the total number of bids. For example, the data can be refreshed every 10 seconds, 30 seconds, or every 60 seconds. This can be accomplished by implementing various scripting libraries, e.g., Ajax and jQuery, to continually refresh and sort the content in such a way that the highest bid is displayed first. If multiple bids are submitted within this predetermined interval the arrangement compares them and only lists the higher bid. If multiple submissions are equivalent, then priority as to the high bid is given to the bid that was first in time. Upon end of the auction timeframe, the auction modules transmit notification to the winning bidder.

In another embodiment, the auction modules are configured to accept only bids having particular characteristics. For example, if the auction charges per bid, the arrangement can discern between valid and invalid (e.g., bids which were outbid prior to auction refresh) bids to only charge for valid bids. In this embodiment, the map/index approach of storing bids can be used. However, in cases where billing for bids imposes technical restraints on the system (e.g., if the information must be immediately known prior to cache refresh), an ACID compliant database can be used. In this way, all bids for a particular auction can be stored in a single document.

Thus, in one or more embodiments, the support server provides modules to effectuate business venture capital support, legal support, gateway support for international patent filings, marketing support, patent conflict disputes, IP auction support. In one or more embodiments, the support server modules are configured to flag for particular support services. Depending on which support service is most appropriate, the support server routes the request to different nodes. The support server can also create an individual status display chart for users to track support service progress. Individual status display charts can be created using various programming languages such as JavaScript, PHP, or Ruby on Rails.

Figure 8:
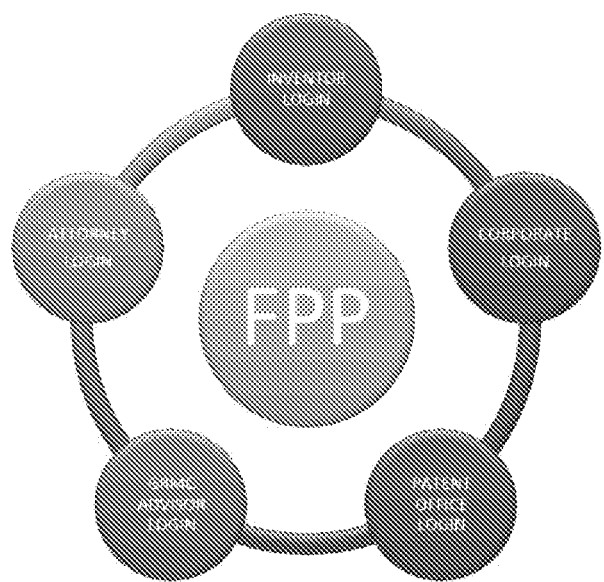
FIG. 8 is an overview diagram detailing the arrangement of specific functionalities of the system described herein in accordance with one embodiment of the invention.
Figure 9:
FIG. 9 is an overview diagram detailing the arrangement of specific functionalities of the system described herein in accordance with one embodiment of the invention.

Without limiting the scope of the disclosure provided herein, the following are examples of the different enabled features supported by the Support Server 120, Patent office login, inventor login, corporate login, attorney login, support company maintenance login as shown in FIGS. 8-9.

Figure 5:
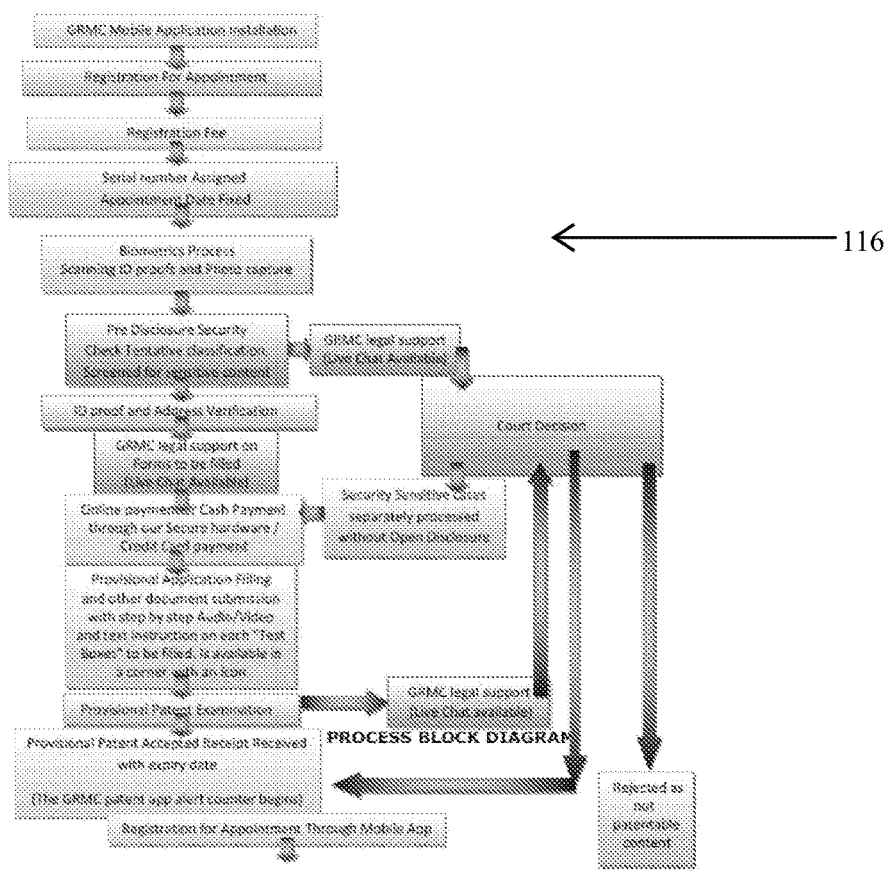
FIG. 5 is a flow diagram detailing the steps of an embodiment of the method as described herein.
Figure 6:
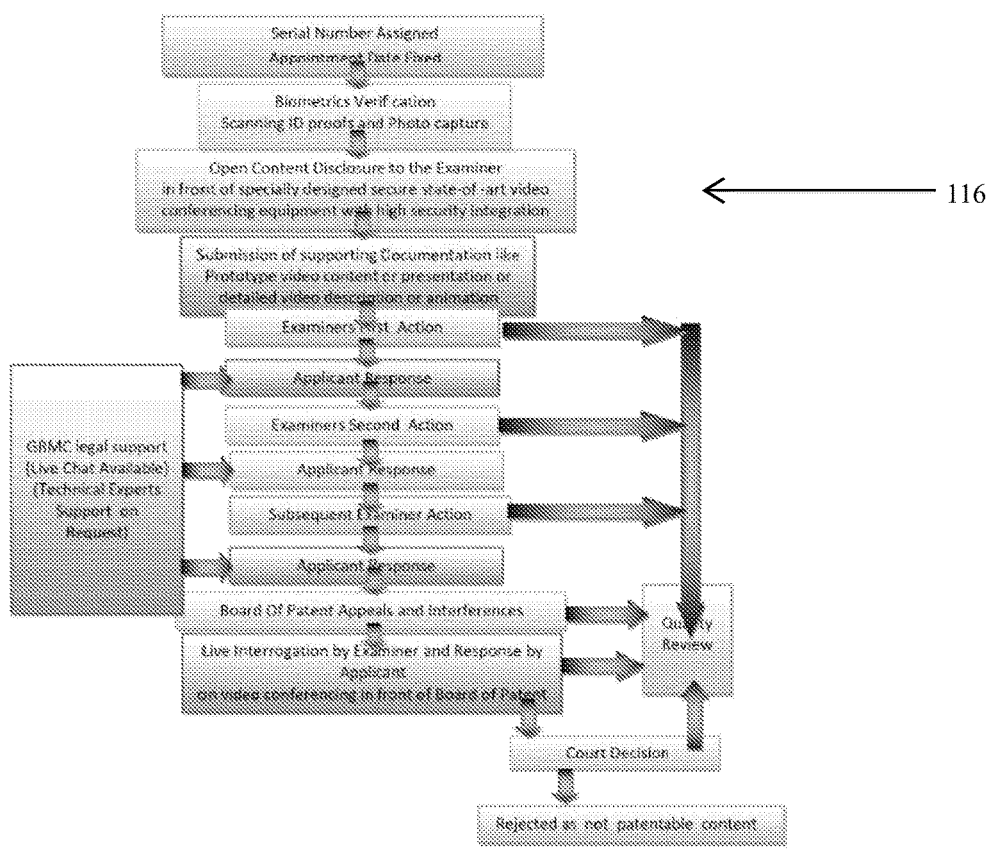
FIG. 6 is a continuation of the flow diagram of FIG. 5 in accordance with an embodiment of the present invention.
Figure 7:
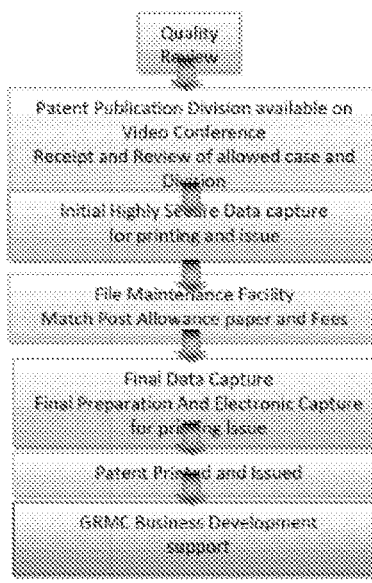
FIG. 7 is a continuation of the flow diagram of FIG. 6 in accordance with one embodiment of the invention.

In one or more embodiments, the user is able to prosecute the generated application at the patent office through the host server 116 as shown in FIGS. 5-7. In one or more embodiments, the host server(s) 116 are located or co-located at each of the national or international patent receiving offices. For example, the host server 116 is provided locally in a secured environment and distributed, replicated and synchronized with a corresponding server at a patent office. However, in another arrangement, the host server 116 is configured to access publically available hooks, controls, bindings, APIs, or other automatic means for accessing, submitting, communicating and executing actions at a desired patent office.

In a non-limiting example of effectuating the processing of patents, the support server is configured with one or more modules to allow the user to set up an appointment online using the disclosure recording device 100, web app 122, or a mobile app (cross-platform). During an appointment the inventor will be given a secure space to disclose personal and patent information using the embedded disclosure platform. Once the disclosure has been captured, the inventor can apply for three (3) types of patents in the United States: Utility patent, Design patent, or Plant patent by selecting the appropriate fields on the display 112. Once the application is completed, a receipt is printed. In one or more embodiments, the receipt is transmitted in the form of a QR code. In some jurisdictions, the application may take up to a year to process. Upon a rejection entered by the requested patent office, one or more modules of the support system access the application and the rejection and generate a notification to be sent to the user informing the user of the receipt of a rejection. Notifications can be generated and pushed from the database to the inventor login page in response to a variety of patent application triggers, such as upon patent office action, reception of documents, patent office communications, and in response to requests for daily, weekly, or monthly status reports. If the user accesses the support server and views the rejection, and/or request consultation from Support Service Provider's network of professionals to tweak and reapply, which includes patent lawyers, advisors, and well established consultants in all industries as shown in FIGS. 5-6. Otherwise the inventor can decide to abandon the project all together. If the application successfully grants as a patent the owner of the patent (inventor) can request for further business services from a Support Services Provider agent to assist in progression to the next level, or the inventor can decide to pursue the venture on his/her own.

In a particular embodiment, the Business Services available from the support server and provided by one or more human or intelligent software agents, include but are not limited to, capital procurement: (i.e., including seed funding & venture capital); product development (including prototype design, product modeling, final product design, coding, and manufacturing); marketing & distribution (including social media marketing, mass marketing through related sales channels, business development, advertising, sales, and product distribution) and other support services (including financial consulting, accounting services, legal consulting, web design & management, IT infrastructure consulting, human resources, and mentoring).

As an example, when an inventor seeks support through the support server 120 for auctioning of patent rights, the support server 120 evaluates the proposed patent rights relative to the other offerings available to the support server 120. Based on this evaluation, the support server 120 automatically makes a bidding to rent/sell rights or to market or support funding of the disclosure. To profit from the inventor's idea, the inventor can sell the patent, license usage rights, or market the product through the support server 120. It should be understood that selling a patent allows the inventor to generate income that will help pay the bills or finance other promising ideas.

Selling a patent outright also eliminates the huge financial outlay required to start up a business based on a new product. Although a quick, hassle-free payoff sounds enticing, by selling the patent the inventor gives up the right to future profits from his or her creation. In addition, the money earned from selling a patent may not be substantial unless the product has been on the market for a long time. The patent buyer usually won't want to spend a lot for an unproven product that might not generate large profits. Thus, the support server 120 provides a one or more modules for implementing a bidding strategy given these constraints and for providing an open or closed bidding event for those inventors trying to sell/rent their patents, with or without legal support. If the subject matter of the disclosure has commercial viability and attracts multiple bids, one or more bidding modules are configured to determine price adjustment and recommendations to the inventor given the level of interest in the subject matter. While the bidding modules seeks to meet investors with subject matter, at the closing of bidding, the inventor retains the right to determine if the patent rights will be sold to the highest bidder or retained by the owner/inventor.

Based on the needs of the user, further services and options provided by the support server are available as further accessible modules. Where the user indicates that they have a company seeking an initial public offering, the support server 120 will help with this IPO stage as well. One or more modules of the support server are configured to access and search for appropriate partners, such as from a database of current users of the system, to assist the company in its public offering.

Corporation Services

In one or more embodiments a general corporate login is provided and preferred for companies that seek to take advantage of the auction and matching services provided by the support server. For instance, a corporation generates an account with the support service server 120 and is permitted to access the submitted disclosures for a certain amount of time. However, under this implementation, the corporation is asked to provide proof of incorporation or formation so that an independent verification of the existence of the corporation can be ascertained. For example, one or more submodules are configured to search the incorporation records or various states, countries, or agencies and verify that the corporation is a valid and duly licensed entity. Likewise, the company is requested to provide the required proof and certification to a support agent, state security team or private intelligence team who are registered with the Support Sever for verification of the existence of the particular company. Furthermore, the company is asked to identify the fields that the company currently operates within. This information is also checked during the verification. The verification check is to avoid entities that have a reputation for obtaining patents, under shell corporations or directly, and asserting those patents against companies, without specific evidence of infringement against any of them.

Attorney Services

In one or more particular embodiments, the support agents provided by the support server are human agents having a legal skill set, such as patent agents, and attorneys. Alternatively, attorneys and others can login to the support server 120 in order to evaluate subject matter disclosures offered for auction and/or perform due diligence within a secure data room that prohibits the removal or copying of information. As with individuals, the following information will be obtained from the attorneys that utilize the support server in their official capacity: user ID, password, email ID, mobile number, address residential, address official, appointment code, ID proof (Attorney ID from court based on country, Mandatory-subjected to verification)/Secure Pass ID (Mandatory-subjected to verification)/Passport number/License/State ID/Country ID (e.g., standard photo in JPEG form). In one or more arrangements, the attorney's credentials will be searched against a database of attorneys using information specified in a database to ensure that the user is a licensed and barred patent agent or agent. For example, heuristic algorithms can be implemented in which during verification, the search groups database information (e.g., attorney credentials) and queries the groups for relevant data matches (e.g., attorney ID number match). After verification from one or more attorney verification services, an unique ID will be issued to the registered and verified attorney that will show that the attorney is an Intellectual Property Attorney and has experience in filing patent applications or evaluating patents. The profile will contain the information about the attorney such as the number of patents filed through by the attorney, number of patents successfully acquired through the attorney, etc.

In addition to the service described, the support service may select based on the information associated with the attorney, attorneys to make offers or support services. Here, when an attorney has a reputation for superior service the support server 120 can suggest to a user that they contact a specific verified attorney, or generate an audio and/or video conference for the attorney to speak (if the attorney has indicated a desire to do so) to the user and offer support or guidance.

In another specific embodiment, attorney logins are provided access to a search engine that allows for the review of the contents of the database 118 (such as a NOSQL database) in order to identify "prior art" disclosures were recorded by the disclosure recording device 100, but are not publically available. Likewise, the patent attorney can submit prior art references or documents to the support server for general use or as applied to a specific subject matter disclosure.

Patent Office Services

In one or more embodiments, each patent office is provided with a direct link to the support services server 120 and the remote server 116. The patent office login is a login where the examiner can check any statements or claims made by the user as it relates to the disclosure and post questions relating thereto. Furthermore, though the web access point 122, the user and the patent examiner can, if desired, discuss potential issues and propose resolutions to clarify the patentability of the subject matter disclosed. Through the support server 120, a patent examiner can communicate with the inventor by live chat, voice call, or video call. The examiner can also check documents submitted along with the patent application, as well as any explanatory videos that were recorded during the documentation capture, such as videos of a working prototype, presentations made at conferences, etc.

The examiner can also have access to the repository where the patent lawyers have added references relating to proposed "prior art." By accessing these third party submissions of prior art, the examiner is able to save time searching for relevant prior art. However, if the examiner seeks more references and decides to perform his own "prior art" search, then the examiner can access one or more databases provided by the support server and preform a prior art search using these databases. In one or more embodiments, the repository includes an artificial intelligence based search engine having web based and mobile-based search tool facilities. Such search tool facilities, in addition to conventional text and keyword based content database searches, can perform voice controlled searches, digital image comparisons, frame-by-frame video comparisons, and audio wave comparisons.

In one or more configurations, supervisors and directors of the patent office will have integrated features to monitor the examiner's actions including full access to the communication between examiner and the inventor on live chat, email, video call, voice call etc. The patent office has complete monitoring facility and read only access to all conversation between the inventor and the examiner. The conversation can also be downloaded for reference in PDF format.

Support Service Provider Login

Support Service Provider login is a channel to communicate between the actual support provider and the user of the apparatus and systems described. Here, the support Service Provider provides support on request from inventor and corporate companies. Support Service Provider operates as a bridge between Inventor and any Company that might be interested in the subject matter disclosed by the inventor. For example, the Support Service Provider can provide a list of companies looking for or capable of providing specific information. The Support Service Provider will support inventors to make their invention into a commercial product and realize a profit out of the invention in secure way.

In a particular embodiment, the support server 120 is configured to generate an appointment scheduler and orchestrate a date for the subject matter of the disclosure to be presented to potential investors or acquirers. In one further embodiment, the support server is configured to generate and distribute access codes to a web conference facility to connect companies interested in the disclosed subject matter evaluate the disclosure and any potential opportunities regarding the same.

Non-Practicing Entity Defense

The present system utilizes web application and network firewalls and other security tools to provide independent monitoring for transactions engaged in by a patent office or the Support Service Provider. However, such security protocols can be extended to existing third party patent and/or trademark databases.

Currently, a when a search for prior art is made through existing third party patent search engines and databases, no information about the intent of the searcher is recorded. In contrast, when disclosures stored in the database 118 are searched by corporations or individuals, each search is recorded and the support server 120 utilizes one or more intelligent decision algorithms to identify whether the IP address from where the search originated indicates that the search was conducted by a PAEs. This can be done by logging IP histories of each search. If a PAE is identified, it can thereafter be automatically blocked from using the system.

Thus, the improved patent search security system works based on registered and unregistered searches. Register searcher are those companies who create logins for the support service and utilize the databases provided based on our agreed terms and conditions and unregistered searches are for those who use already existing prior art search engines to find patents and publications. The searches made through the registered login provide the additional subject matter obtained through the disclosure recording device or submitted by patent attorneys and is auxiliary or supplementary to what is available on third party patent databases. The suggestions provided by the search algorithms of the databases 118 and made available to the searcher include this additional information. However, downloads of specific records from the registered databases are monitored. The geospatial location of the initiator of the search is recorded along with time stamp and is geo tagged. Searchers that search beyond the technology that is their business field are considered a as representing a potential threat by a PAEs. Any user labeled by the support server as a threat, is then required to provide a second phase of proof verification and get certified from an intelligence team.

However, by applying the database monitoring technology to other third party patent and trademark databases, searches made through an unregistered prior art search engine can also be monitored.

While this specification contains many specific embodiment details, these should not be construed as limitations on the scope of any embodiment or of what can be claimed, but rather as descriptions of features that can be specific to particular embodiments of particular embodiments. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features can be described above as acting in certain combinations and even initially claimed as such, one or more features from a claimed combination can in some cases be excised from the combination, and the claimed combination can be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the embodiments described above should not be understood as requiring such separation in all embodiments, and it should be understood that the described program components and systems can generally be integrated together in a single software product or packaged into multiple software products.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof.

It should be noted that use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

Particular embodiments of the subject matter described in this specification have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain embodiments, multitasking and parallel processing can be advantageous.

Publications and references to known registered marks representing various systems are cited throughout this application, the disclosures of which are incorporated herein by reference. Citation of the above publications or documents is not intended as an admission that any of the foregoing is pertinent prior art, nor does it constitute any admission as to the contents or date of these publications or documents. All references cited herein are incorporated by reference to the same extent as if each individual publication and references were specifically and individually indicated to be incorporated by reference.

While the invention has been particularly shown and described with reference to a preferred embodiment thereof, it will be understood by those skilled in the art that various changes in form and details may be made therein without departing from the spirit and scope of the invention.

What is claimed is:

1. A multimedia presentation capture and encryption apparatus comprising:
    one or more audiovisual data capture devices configured to acquire and transmit audio and video data corresponding to a speaking engagement by at least one participant;
    at least one biometric authentication apparatus configured to acquire and transmit biometric data of the at least one participant;
    one or more physical document scanning devices configured to generate image data corresponding to the one or more physical documents, described by the at least one participant during the speaking engagement, and transmit the generated image data to a processor;
    a display device; and
    the processor, coupled to one or more audiovisual data capture devices, the biometric authentication apparatus, the one or more physical document scanning devices and the display device, having a memory and configured by program code executed thereby to:
    receive the audio and video data from the one or more audiovisual data capture device,
    extract a first video frame from the received audio and video data, output the video data to the display device,
    receive an input of a selection, by the at least one participant, of a second video frame of the video data output to the display device,
    convert the first video frame into a first converted image the and the second video frame into a second converted image file,
    identifying objects in the first converted image the and the second converted image file to reference in patent drawings;
    transcribe a portion of the received audio and video data into text data wherein the text data includes a description, by the at least one participant, of the first converted image file and the second converted image the,
    generate a patent document that includes at least the text data, and data corresponding to the first converted image file and the second converted image file
    wherein the combined data the includes information obtained from one or more physical documents scanned from the physical document scanning device, and
    wherein the text data includes text extracted from the one or more physical documents,
    receive the biometric data, encrypt the patent document using the biometric data, and transmit the encrypted the patent document over a network to a data file repository.

2. The multimedia presentation capture apparatus of claim 1, wherein the processor is configured by program code to extract one or more frames by:
    selecting a first frame at a first time period from the video data;
    identifying within the first frame one or more first image data objects in the first image data associated with the first frame;
    selecting a second frame at a second time period, the second time period occurring after the first time period;
    identifying one or more of second image data objects within the second image data associated with the second frame;
    comparing the one or more second image data objects within the second frame to the one or more first image data objects within the first frame;
    converting the second frame into image data when one or more of the first image objects identified in the first frame is not identified in the second frame.

3. The multimedia presentation capture apparatus of claim 2, wherein the processor identifies the one or more first image data objects within the first frame using one or more of a dilation, erosion, corner or edge detection techniques configured as code executing by the processor.

4. The multimedia presentation capture apparatus of claim 2, further comprising: assigning the second frame as the first frame and identifying a new video frame as the second frame.

5. The multimedia presentation capture apparatus of claim 2, wherein the processor extracts one or more frames by: identifying in a new frame at time subsequent to the second time period and comparing the one or more image objects within the new frame to the one or more objects within the second frame.

6. The multimedia presentation capture apparatus of claim 1, wherein the processor encrypts the patent document by:
    generating an encryption key for encrypting each row in a data array representing the patent document with a random character from a character set;
    converting each row of the data array using random characters provided by the encryption key; and
    encrypting the encryption key prior to transmission of the data package.

7. The multimedia presentation capture apparatus of claim 6, wherein the data array is an array of pixels.

8. The multimedia capture apparatus of claim 1 wherein the biometric authentication apparatus is one of a fingerprint scanner, an retinal scanner, an iris scanner or a facial recognition camera.

9. The multimedia presentation capture apparatus of claim 1 where the one or more audiovisual data capture devices include a camera.

10. The multimedia presentation capture apparatus of claim 1 where the one or more audiovisual data capture devices include a microphone.

11. The multimedia presentation capture apparatus of claim 1 where the one or more audiovisual data capture devices enable a screen capture from the display.

12. The multimedia presentation capture apparatus of claim 1 where the one or more audiovisual data capture devices enable a screen capture from the display.

13. The multimedia presentation capture apparatus of claim 1 wherein the processor is further configured to analyze the first video frame or the second video frame to identify objects to be referenced in the first patent drawing or the second patent drawing.

14. The multimedia presentation capture apparatus of claim 13 wherein the processor is further configured to apply a reference numeral to an identified object.

* * * * *